(12) United States Patent
Thissen et al.

(10) Patent No.: US 8,631,441 B2
(45) Date of Patent: Jan. 14, 2014

(54) METHOD OF CODING AND TRANSMITTING EPG DATA, CODER AND RECEIVER

(75) Inventors: Rogier Louis Jacques Willem Thissen, Leuven (BE); Rudy Musschebroeck, Leuven (BE); Sebastien Petrucci, Ettebeek (BE); Johan Peeters, Leuven (BE)

(73) Assignee: Pace PLC, West Yorkshire (GB)

( * ) Notice: Subject to any disclaimer, the term of this patent is extended or adjusted under 35 U.S.C. 154(b) by 311 days.

(21) Appl. No.: 10/544,198

(22) PCT Filed: Jan. 20, 2004

(86) PCT No.: PCT/IB2004/050040
§ 371 (c)(1),
(2), (4) Date: Aug. 2, 2005

(87) PCT Pub. No.: WO2004/071084
PCT Pub. Date: Aug. 19, 2004

(65) Prior Publication Data
US 2006/0136905 A1 Jun. 22, 2006

(30) Foreign Application Priority Data
Feb. 5, 2003 (EP) .................................. 03100231

(51) Int. Cl.
*G06F 3/00* (2006.01)
(52) U.S. Cl.
USPC ................................. 725/54; 725/39; 725/44
(58) Field of Classification Search
USPC .................................................. 725/54, 39
See application file for complete search history.

(56) References Cited

U.S. PATENT DOCUMENTS

| | | | |
|---|---|---|---|
| 5,353,121 A * | 10/1994 | Young et al. | 725/52 |
| 5,652,613 A | 7/1997 | Lazarus et al. | |
| 5,801,753 A * | 9/1998 | Eyer et al. | 725/50 |
| 5,844,620 A * | 12/1998 | Coleman et al. | 725/54 |
| 5,867,207 A | 2/1999 | Chancy et al. | |
| 6,239,844 B1 | 5/2001 | Raiyat | |
| 6,263,501 B1 | 7/2001 | Schein et al. | |
| 6,311,329 B1 | 10/2001 | Terakado et al. | |
| 7,058,965 B1 * | 6/2006 | Gordon et al. | 725/39 |
| 2001/0014976 A1 | 8/2001 | Roop et al. | |
| 2001/0016944 A1 | 8/2001 | Terakado et al. | |
| 2002/0129366 A1 * | 9/2002 | Schein et al. | 725/43 |
| 2004/0244058 A1 * | 12/2004 | Carlucci et al. | 725/135 |
| 2005/0210145 A1 * | 9/2005 | Kim et al. | 709/231 |
| 2006/0092052 A1 * | 5/2006 | Baldwin et al. | 341/50 |
| 2007/0174874 A1 * | 7/2007 | Durden et al. | 725/61 |

FOREIGN PATENT DOCUMENTS

| | | |
|---|---|---|
| EP | 1030516 | 8/2000 |
| JP | 2001119674 | 4/2001 |

* cited by examiner

*Primary Examiner* — Brian Pendleton
*Assistant Examiner* — Jean D Saint Cyr
(74) *Attorney, Agent, or Firm* — Nixon Peabody LLP

(57) ABSTRACT

EPG data regarding programs and their scheduled times are structured and/or transmitted in such a way that program and schedule records are interleaved. This scheme allows better handling by receiving devices such as embedded devices (i.e. LCD remote controls), because a more efficient reception and storage of transmitted data is possible. In particular, the receiving device can read, parse and store the downloaded EPG data on the fly as it is being received (it can start reading, parsing and storing before the complete reception of data id finished). At any time when the device would have to stop storing EPG data into persistent storage, (almost) all of the data that was stored can actually be used.

9 Claims, 1 Drawing Sheet

| Record ID | Record |
|---|---|
| p0 | 'News' |
| s01 | 'p0', '8PM', '9PM' |
| p1 | 'Business news' |
| s11 | 'p1', '9PM', '9.30PM', 'live' |
| s12 | 'p1', '10PM', '10.30PM', 'rerun' |
| s13 | 'p1', '11PM', '11.30PM', 'rerun' |
| p2 | 'Matlock' |
| s21 | 'p2', '11.30PM', '12.30PM' |

Order of transmission ↓

METHOD OF CODING AND TRANSMITTING EPG DATA, CODER AND RECEIVER

FIELD OF THE INVENTION

The present invention relates to a method of coding and/or transmitting EPG (electronic program guides) data documents comprising program and schedule records. The invention also relates to a coder for coding EPG (electronic program guide) data comprising program and schedule records and to a device comprising a receiver for receiving transmitted coded EPG (electronic program guide) data comprising a decoder for decoding coded EPG (electronic program guide) data comprising program and schedule records.

BACKGROUND OF THE INVENTION

It is known to transmit information and listings of program information by means of so-called electronic program guides (EPG), which are based on the transmission of a large database of program information. Conventionally, the EPG data produced by e.g. a server regarding programs and their scheduled times is structured into sections. The EPG data is transmitted to a receiving device such as e.g. a remote control device.

Embedded and/or restricted devices need to download large sets of (E)PG data from some server (via Internet, cable, GSM, or any other network). Since devices have limited computing and storage, it can be difficult to store all (E)PG data in a memory.

It is possible to separate the TV listing data in 1) programs and 2) schedules for that program. This separation makes it possible that a program that is rerun several times has only one program record with multiple schedule records.

For example, the show with the title 'Business news' and description 'an update on today's business worldwide', will be rerun at 9 PM, 10 PM, and 11 PM. In that case, there will be one record that contains the program information (program ID, title, description, comments, . . . ), i.e.:

('P3992', 'Business news', 'an update on today's business worldwide', . . . )

Three schedule records will refer to this program. The first schedule will contain the (schedule ID, reference to program ID, start time, end time, indication of time shift, . . . ), i.e.:

('S005', 'P3992', '9 PM', '9:30 PM', 'live', . . . ),
('S006', 'P3992', '10 PM', '10:30 PM', 'rerun', . . . )
('S007', 'P3992', '11 PM', '11:30 PM', 'rerun', . . . )

This known approach saves a lot of space as compared to joining both the program and schedule data into one record. Without joining, also the program info (title, description, . . . ) would be repeated three times.

Examples of such a data coding scheme are e.g. known from U.S. Pat. Nos. 6,263,501 and 5,652,613.

Although this scheme is efficient, problems may arise when a large set of EPG data is transmitted (downloaded) on a device having a relatively small memory or when the transmission is interrupted. In such cases, the present coding schemes for EPG data to be transmitted lead to a loss of useful information of stored data.

SUMMARY OF THE INVENTION

It is the object of the invention to disclose a method, coder and device of the type described in the opening paragraph, allowing an increase of directly useful information, i.e. a reduction of loss of useful information.

To this end a method, coder and device of the type in accordance with the invention are characterized in that the program and schedule record of the EPG data are coded and/or transmitted and received in an order in which program records and schedule records for programs are interleaved. Interleaved means that each program record is followed or preceded by the corresponding schedule records before or after a subsequent program record is coded and/or transmitted. Thus, the program (p) and schedule records (s) are sorted as follows . . . {p1,s11,s12, . . . s1i},{p2,s21,s22, . . . s2i}, {p3,s31, s32,s3i, . . . }, etc.

(preferably) or alternatively

{s11,s12, . . . s1i,p1},{s21,s22, . . . s2i,p2},s31,s32, . . . s3i,p3} wherein p1, p2, p3, etc. are program records and s11,s12, . . . s1i are schedule records corresponding to program record p1 and s21, s22, . . . s2i are schedule records corresponding to p2, etc.

BRIEF DESCRIPTION OF THE DRAWING

FIG. 1 illustrates one embodiment of the invention for transmitting EPG data using interleaved program and scheduling data.

DETAILED DESCRIPTION OF THE INVENTION

The inventors have realized that data are transmitted as follows in the known transmission schemes:

The data is divided into separate sections comprising.

| | short |
|---|---|
| a section with a list of program records | |
| ('P3992', 'Business news', 'an update on today's business worldwide', . . . ) | p1 |
| ('P3993', 'Matlock', 'the world's best lawyer in action', . . . ) | p2 |
| ('P3995', ' ', ' ', . . . ) | p3 |
| ('P3996', ' ', ' ', ' ', . . . ) | P4 |
| a section with a list of schedule records | |
| ('S005', 'P3992', '9PMl', '9:30PM', 'live', . . . ) | s11 |
| ('S006', 'P3992', '10PM', '10:30PM', 'rerun', . . . ) | s12 |
| ('S007', 'P3992', '11PM', '11:30PM', 'rerun', . . . ) | s13 |
| ('S008', 'P3993', '11:30PM', '12:30PM', 'series', . . . ) | s21 |
| ('S009', 'P3995', ' ', ' ', ' ', . . . ) | s31 |
| +possible further sections | |

The indication p1, p2, s11, s12 etc to the right-hand side is shown here for identification purposes as a guide to the eye, but do not form part of the records.

In itself, this coding and transmission scheme offers a very efficient manner of coding, transmitting and organizing the data in many circumstances.

If the total transmitted data does not overload the memory of the device and the transmission is uninterrupted, no real problems occur. However, the problem is that, since the memory is limited, the device may not have enough persistent storage to store all records in the memory. It would have to stop storing downloaded EPG data in the memory when it is full or when a certain limit has been reached. If the transmission is interrupted, the same phenomenon would occur.

In such circumstances the result might be that, whereas all program records are stored, only a few schedule records have been stored. In that case, the receiving device can only use a percentage of the information on TV programs that has been received, because the crucial corresponding schedule records are missing for at least some program records! In fact, the program records that have been stored but for which the schedule records are missing take up valuable memory space.

The same phenomenon occurs when the programs records are first transmitted, in which case the crucial corresponding program records are missing for at least some schedule records.

A related phenomenon occurs when the transmission is interrupted during transmission of the EPG data. In such cases, the problem is not a too small memory, but the interruption of transmission of data.

Stored information is only truly useful when it is complete. In such circumstances, much of the information received is thus incomplete and, consequently, not truly useful.

The efficiency of the data transmission in a data coding method, a coder and device in accordance with the invention is increased because the device can read, parse and store the downloaded EPG data on the fly as it is being received (it can start reading, parsing and storing before the complete reception of data is finished). At any time when the device would have to stop storing EPG data (whether due to a lack of available memory or an unforeseen interruption of transmission) into persistent storage, ahmost all of the data (except for possibly the very last) that was stored can actually be used.

Preferably, the interleaved program and schedule records are sorted on a time basis.

If sorted on time, all data up to a certain time is known to be complete. Gaps in the data are avoided.

It is noted that the total EPG document may have other additional information sections such as a section with detailed information on the content of programs. Preferably, these additional information sections are sorted and/or transmitted after a section with interleaved and sorted program records. The additional information is often background information which is of less importance than the combination of program and schedule records. Such information, although useful, does affect the usefulness of the coded data much less than the interleaved program and schedule records. By coding the interleaved program and schedule codes in a section coded prior (i.e. in front of and transmitted prior to the rest) to other sections comprising information on programs, the most important information is transmitted first. The section comprising the interleaved program and schedule records may be preceded in the coding scheme by short codes with general information, e.g. for identifying the EPG data as such or identifying the section as such.

Preferably, the coding scheme is such that schedule records only refer to program records that are placed above them (not below them) in the scheme . . . {p1,s11,s12, . . . s1i,},{p2,s21,s22, . . . s2i}, {p3,s31, s32,s3i, . . . }.

In comparison with the alternative scheme,

{s11,s12, . . . s1i,p1},{s21,s22, . . . s2i,p2}, {s31,s32, . . . s3i,p3} this scheme offers the advantage that all received information can be identified and allocated and this is useful, whereas in the alternative scheme the last received information part (because of missing the program record) might not be useful.

The EPG document (the section related to the program & schedule info) always starts with a program record: progress 1. (p1) The first schedule record: shedder 1 comes directly thereafter. This schedule record will refer to the progress 1 just before it (p1) and thus could be named s11. This scheme is repeated for all programs, and sorted on the basis of date/time of the schedule records. Only in the case where a program record is a rerun, i.e. would be double, the program record is omitted. The following schedule record will refer to a program record somewhat above it. In this case, two (or more) schedule records follow each other, which could be named s11 and s12, etc.

section with a list of interleaved and sorted program records and schedule records

| ........ | | |
|---|---|---|
| ('P3991', | 'News', 'the news', ..) | p0 |
| ('S005', | 'P3991', '8PM', '9PM', 'live', ....) | s01 |
| ('P3992', | 'Business news', 'an update on today's business worldwide', ...) | p1 |
| ('S001', | 'P3992', '9PM', '9:30PMI,       'live', .....) | s11 |
| ('S001', | 'P3992', 110PMI, '10:30PM',       'rerun', ......) | s12 |
| ('S001', | 'P3992', 111PMI,'11:3-PM',       'rerun', ......) | s13 |
| ('P3993', | 'Matlock', 'the world's best lawyer in action', ......) | p2 |
| ('S008', | 'P3993', '11:30PM', '12:30PM', 'series', | s21 |
| ('P39961, | '...', ' ... ', ...) | p3 |
| ('S009', | 'P3996', ' ', '  ', '...', | s31 |
| ('P4723', | ' ... ', ' ... ', | p4 |
| ('S049', | 'P4723', ' ', '  ', '...', | s41 |

One embodiment for transmitting the interleaved program and schedule (EPG) data is illustrated in FIG. 1.

A possible implementation could consist of:

1. A screen-based remote control (RC) device, used to control the display device and display the EPG content;

2. An internet-access device, used for downloading EPG content onto the control (RC) device;

3. An Internet server, from which EPG content in the form of EPG documents can be retrieved;

Operations are e.g.:

1. On a regular basis, depending on Internet access bandwidth and remote control device memory constraints, the RC requests EPG content from the server. Alternatively, the server may push an EPG document, i.e. send it even without an implicit request.

2. In response to such a request, the server prepares an EPG document coded in accordance with the ordering, sorting and program/schedule interleaving rules in this invention or it may push it. For instance, the EPG data is encoded into an XML format. It is to be noted that the server may comprise a document which is already encoded in the manner in accordance with the invention, in which case "preparation" is simply taken for the document that has already been properly encoded or, alternatively, if such a document is not directly available, the server prepares such an EPG document by retrieving information from other documents and by coding the information in the manner in accordance with the invention. To this end, the server comprises, has access to or is linked with a coder for coding an EPG document in accordance with the invention.

3. The server will start sending the (partially) prepared EPG document to the RC.

4. On the fly, the EPG document is received, parsed and stored in persistent storage on the RC. To this end, the RC device (or any other device for receiving the EPG data) comprises a receiver and a decoder for decoding the EPG data document coded in accordance with the invention.

5. When finished, or when the storage on the receiving device exceeds a certain limit, the data is still received, but cannot be stored in the memory anymore. Optionally, the connection can be ended.

6. The device is certain that all stored data can be optimally used, also when not all data could have been stored. This is the great advantage of using interleaved program and schedule records, in comparison with the known method of coding and transmitting the data in separate program and schedule code sections.

Access to this Internet site or sites by the remote control device is provided through e.g. an Internet-connected device. This may be a PC, STB or dedicated Internet-connection device like a modem.

The invention can be used e.g. in TV receivers and VCRs or multi-media PCs equipped with a video/delete capture card.

An example of an implementation of XML encoded EPG data is given below.

TABLE 1

Implementation example of an excerpt of XML encoded EPG data

```
<program id="392033">
    <title>Matlock</title>
</program>
<schedule program='392033" channel="10" starttime="12.30:00" endtime="12:45:00" />
<program id="49332">
    <title>Jett Jackson</title>
    <description>Great episode of Jett Jackson.</description>
</program>
<schedule program="49332" channel="21" starttime="20:50:00" endtime="21:15:00" />
<program id="03992">
    <title>The X-Files</title>
    <description>Mulder encounters ET.<description>
</program>
<schedule program="03992" channel="32" starttime='21:00:00" endtime="22:00:00" />
<schedule program="03992" channel="21" starttime="22:30:00" endtime="22:30:00"/>
<program id="69782">
    <title>News</title>
    <description>The daily news.</description>
</program>
<schedule program="69782" channel="31" starttime="09:00:00" endtime="10:00:00" />
```

Within the concept of the invention, a "means for coding", "coder", "means for decoding", "decoder", etc. is to be broadly understood and to comprise e.g. any piece of hardware (such as a coder or decoder), any circuit or sub-circuit designed to perform a conversion, imposition, rendition as described, as well as any piece of software (computer program or sub-program or set of computer programs, or program code(s)) designed or programmed to perform a coding or decoding operation in accordance with the invention, as well as any combination of pieces of hardware and software acting as such, alone or in combination, without being restricted to the examples of embodiments given below.

The invention is also embodied in a device (such as a server) comprising a coder for coding EPG (electronic program guide) data comprising program and schedule records in accordance with the method of the invention, in its broadest scope as well as in any one of the preferred embodiments described above.

The invention is also embodied in a receiving device (RC) comprising a decoder for decoding EPG (electronic program guide) data comprising program and schedule records in accordance with the method of the invention, in its broadest scope as well as in any one of the preferred embodiments described above.

The invention is also embodied in any computer program comprising program code means for performing a method in accordance with the invention when said program is run on a computer, as well as in any computer program product comprising program code means stored on a computer-readable medium for performing a method in accordance with the invention, when said program is run on a computer.

It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The present invention has been described in terms of specific embodiments, which are illustrative of the invention and should not be construed as limiting. The invention may be implemented in hardware, firmware or software, or in a combination of them. Other embodiments are within the scope of the following claims.

In summary, the invention may be described as follows:

EPG data regarding programs and their scheduled times are structured and/or transmitted in such a way that program and schedule records are interleaved. This scheme allows better handling by receiving devices such as embedded devices (i.e. LCD remote controls), because a more efficient reception and storage of transmitted data is possible. In particular, the receiving device can read, parse and store the downloaded EPG data on the fly as it is being received (it can start reading, parsing and storing before the complete reception of data is finished). At any time when the device would have to stop storing EPG data into persistent storage, (almost) all of the data that was stored can actually be used. The invention is embodied in a method, but may equally be embodied in a coder or a decoder or a device comprising a coder or a decoder.

The invention claimed is:

1. A method of coding and/or transmitting EPG (electronic program guide) data, the data comprising:
   a plurality of program records, each program record identifying one program;
   a plurality of schedule records, each schedule record identifying one or more specific scheduled broadcast times of one program,
   the program records and the schedule records being coded and/or transmitted in an interleaved manner such that two successive program records are separated by one or more schedule records associated with one of the two successive program records;
   wherein each program record and all of the schedule records for that program record are transmitted prior to the next program record being transmitted; and
   once transmitted, at a receiving device comprising a processor and a memory, the received EPG data is read, parsed and stored in the memory as it is being received and prior to the complete reception of all of the data for the EPG.

2. A method as claimed in claim 1, characterized in that the interleaved program records and schedule records are sorted on a time basis.

3. A method as claimed in claim 1, characterized in that schedule records refer to program records that are ahead in the coding scheme.

4. A method as claimed in claim 1, characterized in that the interleaved program records and schedule records are coded in a section, which is separate and ahead in the coding scheme from other sections comprising information relating to the programs.

5. A method as claimed in claim 4, characterized in that the section, which comprises interleaved program records and schedule records, is preceded by a section comprising general information.

6. A device comprising an encoder for coding EPG data comprising program records and schedule records in accordance with the method as claimed in claim 1.

7. A receiving device (RC) comprising a decoder for decoding EPG data comprising program records and schedule records coded in accordance with the method as claimed in claim 1.

8. The method according to claim 1, wherein upon storing in memory, substantially all stored EPG data is complete for both program records and schedule records.

9. A method for transmitting EPG (electronic program guide) data to a receiving device comprising:
- transmitting EPG data comprising a plurality of program records and a plurality of schedule records in an interleaved manner, each of the plurality of program records identifying one program and each of the plurality of schedule records identifying one or more specific scheduled broadcast times of one program, wherein the program records and schedule records are interleaved such that two successive program records are separated by one or more schedule records associated with one of the two successive program records, and
- transmitting the EPG data to a receiving device comprising a processor and a memory, wherein each program record and its associated schedule records are transmitted prior to the next program and its associated schedule records being transmitted such that each program record and its associated schedule records are received at the receiving device before the next program record is received and the EPG data for each program is read, parsed and stored in the memory as it is being received before the complete reception of all EPG data.

* * * * *